May 23, 1933. S. H. NORTON 1,910,355
SLIDE FASTENER
Filed Jan. 9, 1931
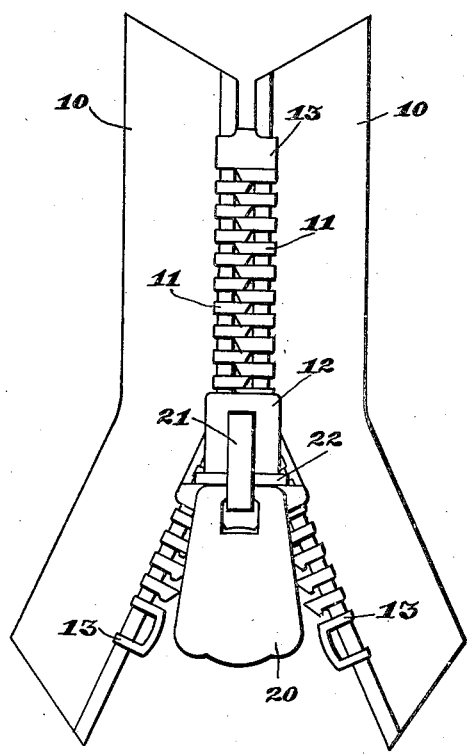
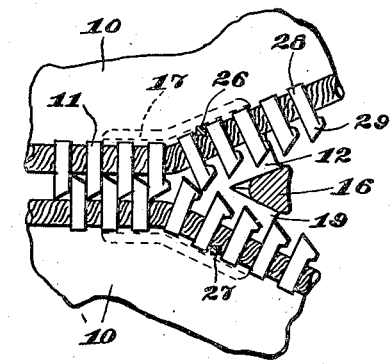
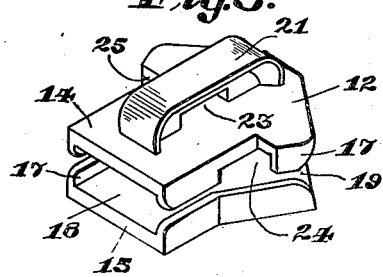
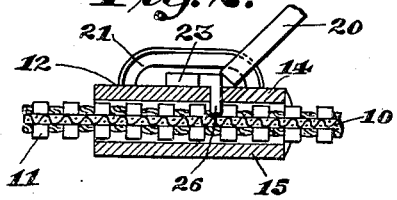
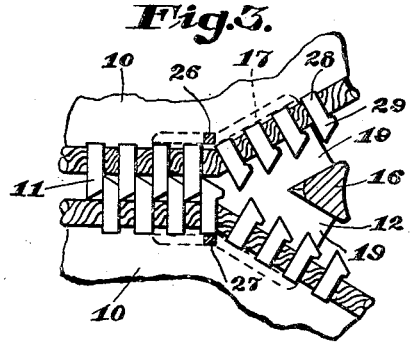
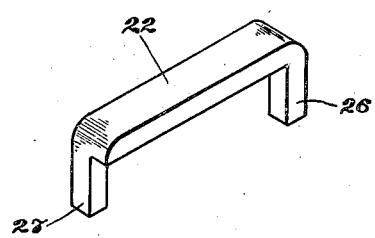
INVENTOR.
Samuel H. Norton
BY R. S. Kelley
ATTORNEY.

Patented May 23, 1933

1,910,355

UNITED STATES PATENT OFFICE

SAMUEL H. NORTON, OF MEADVILLE, PENNSYLVANIA, ASSIGNOR TO HOOKLESS FASTENER COMPANY, A CORPORATION OF PENNSYLVANIA

SLIDE FASTENER

Application filed January 9, 1931. Serial No. 507,571.

My invention relates to slide fasteners and particularly to devices for preventing unintentional opening of the fasteners when closed.

An object of the invention is to provide a slider for slide fasteners which embodies an improved locking device.

Another object is to provide an improved device for locking the slider which will engage the fastener elements where they are securely fastened to the stringers.

A still further object is to provide an improved locking device for sliders of slide fasteners wherein a plurality of locking projections engage fastener elements on the opposite stringers.

Other objects and advantages of my invention will more fully appear during the course of the following specification and will be particularly pointed out in the appended claims.

In the accompanying drawing, I have shown for purposes of illustration, one embodiment which my invention may assume in practice. In the drawing:

Fig. 1 is a plan view showing a slide fastener embodying my improvement.

Fig. 2 is a longitudinal sectional view through the slider and a portion of the fastener.

Fig. 3 is a horizontal sectional view through the slider and locking device and associated parts of the fastener.

Fig. 4 is a view similar to Fig. 3 with the locking device in a different position.

Fig. 5 is a perspective view of the slider.

Fig. 6 is a perspective view of the locking detent.

The fastener with which my invention is illustrated is a well-known article of commerce and is similar to the fastener of the patent to Gideon Sundback, 1,219,881, March 20, 1917. It is therefore believed that only a brief general explanation with a more detailed description of the parts which cooperate with the invention will be sufficient.

As shown in Fig. 1, the fastener comprises a pair of flexible stringers 10 which as usually made, are in the form of flat tapes or braids having corded edges which may be readily gripped by the fastener elements. The metal fastener elements 11 are arranged in spaced relation, one series on the edge of each stringer, the elements of one series being staggered with relation to the elements of the other series. A slider 12 is mounted for slidable movement along the stringers and when operated in one direction, disengages the fastener elements to open the fastener and engages the fastener elements to close the fastener. Suitable end stop members 13 are attached to the stringers for limiting opening and closing of the slider.

The slider 12 comprises upper and lower wings 14 and 15 respectively joined together at one end by an integral wedge shaped connecting portion 16 and having inturned side flanges 17. The wings, neck and side flanges define a Y-shaped channel 18 having branches 19 diverging at the rear end and converging into a single channel at the front end of the slider. As is well understood in the art, these channels serve to guide the fastener elements into and out of engagement and disengagement in progressive order as the slider moves along the stringers. In order that the operator may move the slider along the stringers, a pull member 20 is attached to the slider by a track lug 21 in such a manner that it may shift from one end to the other in the direction of movement. The narrow end of the slider is referred to as the forward end and the wide end as the rear end.

Unless some retaining device is provided, it will readily be seen that due to the shape of the slider channels, the slider will move back along the elements when the fastener is used in articles that impose a stress on the fastener in the locality of the slider. To prevent this undesired movement, I have devised a locking combination including a locking bar or detent 22 extending across the body of the slider and mounted thereon for limited longitudinal movement. The locking bar 22 extends through a hole 23 in the pull attaching lug 21 which is made somewhat longer than the width of the locking bar or detent 22, in order to allow longitudinal movement. The upper wing of the slider is notched out on both sides to provide recesses 24 and 25 which extend into the side edges of the slider and the diverging channels and which cut away a portion of the side flanges 17. The locking detent 22 has projections 26 and 27 which extend at right angles to the bar and seat themselves in the recesses 24 and 25 respectively for engagement with the extreme attached ends of the fastener element. As noted, each fastener element has what may be termed a jaw end 28 for attachment to the stringer and an interlocking end 29 free from the stringer, and it is especially desirable to lock by engagement with the attached end.

The space between the locking members 26 and 27 is made just about equal to the width of the slider channel at its narrow end. When the locking detent is shifted to the wide end of the slider, the projections 26 and 27 enter into the diverging channels and at this point the stringers are spread apart slightly and the attached ends of the fastener elements will be further apart than the space between the locking projections. It will thus be seen in Fig. 4 that the locking projections will engage in the spaces between two adjacent fastener elements on each of the stringers. The shifting toward the wide end to lock the slider will take place more or less automatically when a pull is placed on the stringers in the locality of the slider, and the locking detent will catch on the corners of the fastener elements and lock the slider against further movement. If the locking detent should fail to drop into locking position, it may easily be shifted by hand. Unlocking may readily be accomplished without special attention from the operator because when he takes hold of the pull 20 to shift the slider, he will automatically move the locking detent to open position.

As a result of my invention, it will be observed that a very simple and effective locking device has been provided which will prevent unintended movement of the slider. An effective lock against opening movement is produced because the fastener elements are engaged on both stringers at points where they are most securely attached to the flexible stringers.

While I have in this application specifically described one embodiment which my invention may assume in practice, it will be understood that this embodiment is merely for the purposes of illustration and description and that various other forms may be devised within the scope of my invention as defined in the appended claims.

What I claim as my invention is:

1. In a continuous fastening device of the class described, a pair of members to be fastened, cooperating series of fastener elements attached to said members, a slider movable along said elements for progressively engaging and disengaging the same and having a recess formed in one side edge thereof, a locking member carried by said slider and formed and positioned to lock the slider against movement while seated in said recess and releasing the same when moved forwardly from seated position in said recess, and a pull member for the slider separate from said locking member adapted also to control said locking member.

2. In a continuous fastening device of the class described, a pair of flexible stringers, cooperating series of fastener elements attached to the adjacent edges of said stringers, each element having an interlocking end projecting free from the stringer, a slider movable along said stringers for engaging and disengaging said elements, and a locking member carried by said slider and movable relative to said slider rectilinearly only in a direction parallel to said stringers, said locking member in one position having a projection formed and positioned to engage a fastener element to lock the slider in position.

3. In a fastening device of the class described, a pair of flexible stringers, cooperating series of spaced fastener elements arranged along the adjacent edges of said stringers, each element having an interlocking end projecting free from the stringer and a jaw end by which it is attached, and a locking detent carried by said slider and capable of relative movement on the slider longitudinally of the stringers, said detent extending across the slider body and having a projection on each end thereof formed and positioned to enter between the extreme jaw ends of adjacent fastener elements on both stringers.

4. In a fastening device of the class described, a pair of flexible stringers, cooperating series of fastener elements arranged in closely spaced relation along the adjacent edges of said stringers, each element having a jaw end for attaching it to the stringer and an interlocking end projecting free from the stringer, a slider movable along said stringers for progressively engaging and disengaging the elements, and a locking detent extending across said slider and having a projection at each end thereof, said detent being mounted on said slider for relative longitudinal movement thereon and said projections formed and positioned so that in one extreme position of said detent the same engages the jaw ends of fastener elements on opposite stringers for locking the slider and in the other position of movement being disengaged from the elements, and a pull member on said slider formed and positioned also to control movement of said detent.

5. In a fastening device of the class described, a pair of flexible stringers, cooperating series of fastener elements arranged in spaced relation along the adjacent edges of the stringers, each element having a jaw end for attaching it to its stringer and an interlocking end, a slider having a Y-shaped channel to receive said elements with diverging branches at the one end converging into a single branch at the other end, guide flanges at least one of which has a recess extending into one of the diverging branches of the channel, a locking member slidable longitudinally of said slider and having a projection formed and positioned to move in said recess and into engagement with the fastener elements for locking the slider.

6. In a fastener device of the class described, a pair of flexible stringers, cooperating fastener elements arranged in spaced relation along the adjacent edges of the stringers, a slider movable along said elements for engaging and disengaging the same, said slider comprising parallel spaced wings united at one end, the lateral edges of at least one of said wings being turned inwardly to provide guide flanges, said slider wings being relatively narrow at one end and gradually widening from a point spaced from the front end to the rear end of the slider, one of said wings being cut away along at least one side edge in said widening portion to expose portions of the fastener elements, and a locking detent formed and positioned to move in said cut away portion to engage the fastener elements for locking the slider.

In testimony whereof I affix my signature.
SAMUEL H. NORTON.